March 3, 1964  R. J. SCHNEEBERGER  3,123,737
ELECTRONIC DISCHARGE DEVICE
Filed June 28, 1956
2 Sheets-Sheet 1

INVENTOR
Robert J. Schneeberger
BY
Charles F. Reins
ATTORNEY 3,123,737
ELECTRONIC DISCHARGE DEVICE
Robert J. Schneeberger, Pittsburgh, Pa., assignor to Westinghouse Electric Corporation, East Pittsburgh, Pa., a corporation of Pennsylvania
Filed June 28, 1956, Ser. No. 594,649
8 Claims. (Cl. 315—10)

This invention relates to electronic discharge devices and, more particularly, to detection and image pickup devices.

It is an object of my invention to produce a highly sensitive radiation detection device.

It is another object to provide a highly sensitive infrared radiation image pickup tube.

It is another object to provide a device in which infrared radiation from a scene may be converted into a space distribution conductivity image within a thin film.

It is another object to provide a device in which radiation from a scene may be converted into a space distribution of charge elements and the charge image read and removed by means of an electronic beam.

It is another object to provide a thermally sensitive electrode member which is substantially uniformly responsive to infrared radiations from 1 to 25 microns and primarily in the region of 8 to 12 microns.

It is another object to provide an infrared radiation sensitive pickup tube in which the radiations are first converted into a thermal pattern and then impressed on a layer to vary the resistivity thereof.

It is another object to provide an image device that is sensitive not only to infrared radiations but also to visible and ultraviolet radiation.

These and other objects are effected by my invention as will be apparent from the following description taken in accordance with the accompanying drawing throughout which like reference characters indicate like parts and in which.

Figure 1:
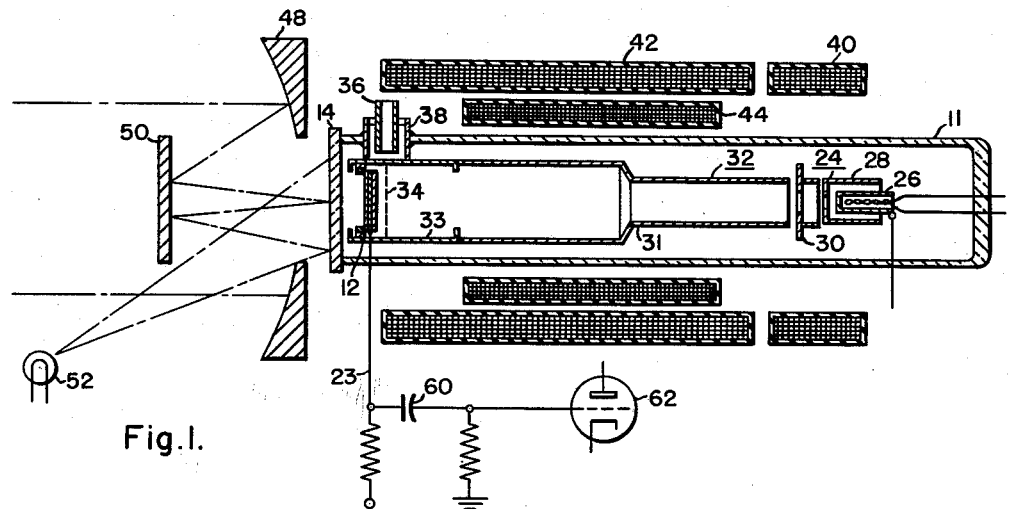
FIGURE 1 is a schematic representation of an electronic discharge device embodying the principles of my invention.
Figure 2:
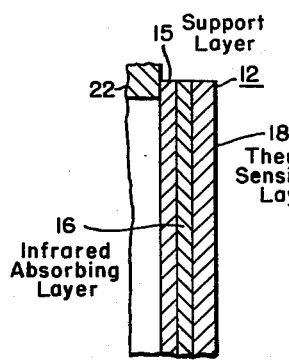
FIG. 2 is a schematic cross section of a target screen employed in FIG. 1.

Referring in detail to FIGS. 1 and 2 an evacuated vacuum tight enclosure 11 of a suitable material such as glass is utilized to enclose a thermally sensitive target structure 12 and the associated electronic beam scanning system. In this specific embodiment, radiations from a scene are projected onto the thermal sensitive target 12 and translated into a distributed charge image on the target. An electron beam is utilized to read the charge image and convert the charge image into electric signals for transmission.

The envelope 11 has an input window 14 at one end which is of a suitably wide band transmitting material such as silver chloride, barium fluoride, or calcium fluoride. The window 14 permits the transmission of both visible and infrared radiation up to at least 14 microns in wavelength. The target 12, which is positioned near the input window 14, is shown in detail in FIG. 2 and comprises a support member 15 with an infrared absorbing layer 16 deposited on the surface remote from the input window 14. The input window 14 may also serve as the support member. A layer 18 of a thermally sensitive semiconductor material is deposited on the exposed surface of the infrared absorbing layer 16. The layer 16 is in intimate thermal contact with the layer 18. The target assembly 12 may also, with suitable precautions, be constructed directly on the window 14 and supported thereon.

In the specific embodiment shown in FIGS. 1 and 2, the layers 16 and 18 are supported by the thin support film 15 of a suitable organic film such as cellulose nitrate which, in turn, is supported about its periphery by a suitable support ring 22 of a material such as nickel. The cellulose nitrate film 15 is transparent to both the visible and infrared radiation and is on the side of the target electrode 12 adjacent the input window 14. A lead 23 is provided from the target electrode 12 to the exterior of the envelope 11. It is electrically connected to the infrared absorbing layer 16.

An electron gun 24 is provided at the opposite end of the envelope 11 to scan the exposed surface of the semiconductor layer 18. The gun 24 consists of a cathode 26, a control grid 28, an accelerating grid 30 and an anode 32. The control grid 28 may operate from 0 to 100 volts negative with respect to the cathode 26. The anode structure 32 extends from the accelerating grid 30 to the vicinity of the input window 14 and controls the potential of most of the space through which the electron beam moves from the cathode 26 to the target 12. The anode 32 is operated at a positive potential of slightly less than 300 volts with respect to the cathode 26.

In the specific device shown, the anode 32 is composed of two tubular sections 31 and 33. The section 33 is the end portion of the anode 32 and is of a good heat conductive material such as copper. The remaining section 31 of the anode 32 is of a material such as "Nichrome." It is necessary that the section 31 be of a nonmagnetic material such as "Nichrome," a nickel-chromium alloy, in order not to interfere with the magnetic fields used for focusing deflection of the electron beam from the electron gun 24.

The target 12 is mounted within the interior of the section 33. The target 12 is electrically insulated from the anode 32. A grid member 34 of the order of 500 mesh per inch is positioned adjacent the target 12 and between the target 12 and the electron gun 24. The grid 34 is at the potential of the anode 32 and provides a more uniform deacceleration field for the electrons.

The section 33 may be provided with inturned flanges on the ends thereof. The section 33 is designed to provide means of isolating the target 12 from unwanted radiations. The section 33 may also be used for cooling the target 12. Two concentric tubular members 36 and 38 are connected to the section 33 and extend to the exterior of the envelope 11 to provide means of flowing a cooling medium over a portion of the surface of the section 33. It may be desirable to make the section 33 of concentric tubular members to apply the cooling medium to the entire surface. The inner surface of the section 33 may also be coated with a good heat absorbing material such as gold black to reduce reflections.

Positioned on the exterior portion of the envelope 11 is an alignment coil 40, a focussing coil 42 and also the horizontal and vertical deflection coils 44 for focussing and deflecting the electron beam in a predetermined raster over the surface of the target 12. The potential applied to the target electrode 12 may be approximately 30 volts positive with respect to the cathode 26.

Positioned exterior of the envelope 11 and in front of the input window 14 is a suitable optical system represented by the mirrors 48 and 50 for focussing the infrared radiations from a scene onto the target electrode 12.

An auxiliary light source 52 of selected wavelength in the range of ultraviolet or visible light, depending on the material of the thermally sensitive layer 18, may be provided in front of the input window 14 for illuminating the target electrode 12 in a manner described later.

The structure and operation of the thermally sensitive target 12 is as follows. The layer 18 is a semiconductive material having a resistivity of the order of $10^{12}$ ohm centimeters in an unexcited state and exhibits the property of an increased conductivity on heating. Inorganic materials such as arsenic trisulfide, antimony trisulfide, cadmium sulfide, cadmium selenide, zinc sulfide, zinc selenide, lead oxide, and amorphous selenium when deposited in the form of thin films of the order of .15 to 10 microns thickness, exhibit conductivity under the influence of strong electric fields when excited by photons, electrons, thermal activation of traps, or injected carriers. These semiconductor materials, arsenic trisulfide, for example, absorb substantially visible light quantities from about .4 micron to .60 micron in wavelength. At longer wavelengths, the absorption is substantially zero. If the material is excited by light of a wavelength between .4 micron and .60 micron, the layer exhibits what is known as photoconductivity, and the resistance of the material decreases in proportion to the radiation. As the wavelength of the light used to radiate the material increases, the light quanta have progressively less energy in accordance with the equelation $E=h\nu$, where E is the energy of light quanta, $h$ is Planck's constant and the $\nu$ is frequency which, of course, is inversely proportional to the wavelength. It is seen that a point will be reached at which the light quanta have just sufficient energy to break a covalent bond and transfer an electron from the valence band to the conduction band. This wavelength is known as the internal long wavelength or threshold wavelength of the material. For antimony trisulfide, this wavelength is about .60 micron which is equivalent to about 2 electron volts. This does not produce a sharp cutoff in most devices due to the operating temperature of the film. Those light quanta of a wavelength greater than the threshold wavelength of the material have insufficient energy to generate electron-hole pairs and therefore do not produce conductivity. The quantum effect in a photoconductor, such as antimony trisulfide does not provide a suitable device for detection of infrared radiations of the order of 6 to 10 microns. The infrared radiations at this wavelength would substantially be transmitted through the thin film.

It has been found that by using thermal excitation (heating) to modulate the conductivity set up by various means within thin films of this type of semiconductor, an excellent thermal image may be obtained.

Infrared or thermal sensitive devices may be utilized to detect and translate a thermal image into a light image by virtue of differential radiation due to differences in temperature or emissivity among the various objects of an observed scene. The medium infrared region, 1 micron to 25 microns in wavelength and particularly 8 to 12 microns is the region of primary interest for this transmission due to low absorption of energy in the atmosphere.

A solid in thermal equilibrium has its electrons and holes distributed among available energy states in accordance with Fermi statistics. In thermal equilibrium, a fraction of the total number of holes and electrons are in free states and determine the "dark" conductivity of the solid. The absorption of light disturbs this distribution so that more electrons and holes are in free states and the conductivity is increased.

When radiation raises an electron to the conduction band, either directly or by way of an excited state, the electron may contribute to the electrical conductivity, and when this occurs in solids which are insulators, the effect is called photoconductivity. An electron raised to an excitation level by incident radiation may receive further energy necessary for transition to the conduction band by receiving energy from the lattice vibrations, i.e., thermal energy. Thus, an absorbed photon of less energy than required to raise an electron from the valence band to the conductor band may induce conductivity because the additional energy required is obtained from the thermal energy which is a function of the temperature of the solid. Electrons in traps just below the conduction band can be stimulated by thermal energy and the resulting conductivity is thus associated with the thermal or temperature activation of these traps.

Selenium (amorphous) is an exception in that the holes, rather than the electrons, are the carriers. The increase of photocurrent with increase in temperature indicates that a large fraction, if not all, of the holes are trapped at various times in transit and depend upon the temperature for release to give sustained currents.

Figure 7:
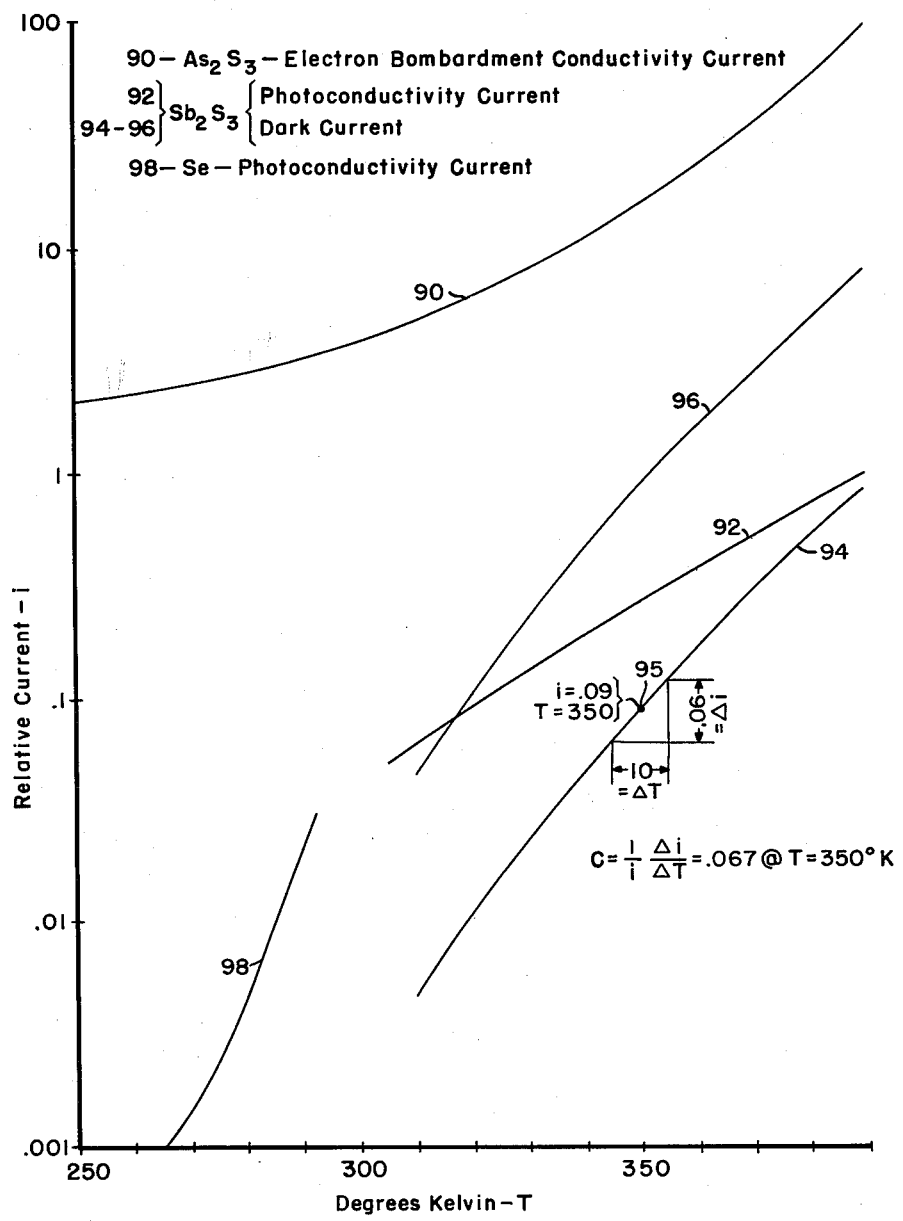
FIG. 7 shows curves illustrating the conductivity of various materials as a function of temperature.

The thermal effects on the conductivity of certain materials are more clearly shown in FIG. 7. In FIG. 7, curve 90 illustrates the effect of temperature on the conductivity of a film of arsenic trisulfide. The film is subjected to both an electric field and electron bombardment. This type of conductivity is referred to as electron bombardment induced conductivity. Curves 92, 94 and 96 illustrate the conductivity within a layer of antimony trisulfide plotted as a function of temperature. An electric field is applied across the film. The curve 92 is for light current which is primarily due to photoconduction. The other curves 94 and 96 are for dark current at different field excitation. Curve 93 represents the current through a film of amorphous selenium plotted as a function of temperature. The film is subjected to both a field and light excitation to obtain photoconduction. All the curves in FIG. 7 clearly show that the conductivity within these materials, no matter how it is initially produced, is strongly dependent on temperature.

An expression $$C=\frac{1}{i}\frac{\Delta i}{\Delta T}$$

aids in the analysis of the curves and is one of the parameters which determines the contrast sensitivity of a thermal imaging device. For high sensitivity, a high contrast for a given temperature change is desired. Contrast is defined as $\Delta i/i$. It is apparent that C is a measure of the contrast obtained for a given temperature change, and is simply the slope of the log current vs. temperature curves as in FIG. 7. At a point 95 on curve 94, the C-value would be .067 at 350° K. By increasing the applied voltage, the dark current or operating point can be increased on the curve 96. However, the C-value remains the same as in curve 94.

The signal-to-noise ratio $$\frac{\Delta i}{i_{noise}}$$

of the system should be considerably greater than unity for good resolution and for other aspects of performance. In the system, $i_{noise}$ is constant and is due to the noise of the first amplifier stage and it is important that the signal $\Delta i$ be high. This can be accomplished by increasing $i$ to a sufficient value as shown by solving for $\Delta i$ which gives $$\Delta i = Ci\Delta T$$

The value of operating point $i$ can be controlled by controlling the target voltage, operating temperature or by excitation to produce photoconductivity or electron bombardment conductivity.

Another operating condition which must be met is that $\Delta i/f(i)$ should be greater than unity, where $f(i)$=noise due to target non-uniformities. The problem of keeping target non-uniformities at a minimum can be attacked by keeping the layers of uniform physical, optical and electrical thicknesses.

While sufficient free electrons may be present to produce the required conductivity without auxiliary radiation, the actual conductivity is sometimes limited by space charge. For the plane parallel case of a solid, the space charge limited current I is $$I = 10^{-13}\frac{V^2 \mu k}{L^3} \text{ amps/cm.}^2$$

where V is the voltage across faces of the layer, L is the layer thickness, $k$ is the dielectric constant and $\mu$ is the mobility. Thus, it is seen that current is proportional to the square of the voltage. The effective mobility is usually many orders of magnitude less than the measured Hall mobility $\mu$, and accounts for the low currents that are observed through an insulator. Injection of carriers at very high fields may take place and contribute its share to the voltage dependent current in addition to the space charge limitation. However, it is felt that in the normal operating range, field injected carriers play a minor role.

In the structure shown, a layer of semiconductor material is used which exhibits the property of change in conductivity with temperature, the conductivity itself being provided by photons, electrons, thermal activation of traps or injected carriers.

In order to incorporate a semiconductor material exhibiting the above described properties into a tube and utilize its thermal sensitivity, it is necessary to absorb infrared radiations and convert them into a thermal image which is in turn impressed on the semiconductor layer.

It is found that metallic black deposits such as gold or platinum are particularly desirable as infrared absorbing materials. For example, gold black has a high ratio of infrared absorption to thermal mass. It is also found that gold black has substantially uniform absorption in the wavelength region of 2 to 15 microns. The gold black gives a material of small heat capacity per unit area to produce a maximum temperature change per unit time per absorbed radiation. The gold black also gives a material of low heat conductivity per unit distance to produce a maximum local temperature change per absorbed radiation.

The gold black deposit is prepared by evaporating gold in an inert atmosphere such as nitrogen at a pressure of about 2 millimeters of mercury with care to exclude oxygen. The resulting deposit is a very porous structure. The gold particles in the deposit occupy approximately 1/500 of the total volume of the deposit. Each particle of the gold touches adjacent neighbors resulting in good electrical conductivity resembling a thin metal film.

Referring in detail to FIGS. 1 and 2, the layer 16 of gold black is deposited on the surface of the support film 15. A support ring 22 of a material such as nickel of a thickness of 30 mils provides peripheral support for the layer 15. The support layer 15 of a thickness of about 500 to 2000 angstroms may be placed on the ring 22 by spreading a material such as cellulose nitrate on a water surface and then lifting the ring so that a thin film of the cellulose nitrate material is stretched thereon. The support layer 15 absorbs less than a few percent of the infrared radiations. The support layer 15 must also have low thermal capacity. The layer 16 of gold black may be deposited in the manner previously described and should be of a thickness of about 5 to 20 microns for suitable thermal and absorption properties.

The semiconductor layer 18 is deposited onto the layer 16 of gold black. The semiconductor material such as antimony trisulfide may also be deposited in a similar manner as the gold to obtain a sooty form deposit layer in intimate thermal contact with the layer of gold black. The semiconductor layer may be about 2 to 10 microns in thickness.

The sooty type deposit achieves a layer of low electrical capacity and low heat capacity of less than $10^{-4}$ watt seconds per degree Kelvin per square centimeter. It is necessary to have low electrical capacity for short beam charging time and low heat capacity for rapid heat response. The thermal time constant of the target must be less than 1/30 of a second or the time that is required for the electron beam to strike a spot and then return on the next scanning raster if moving objects are to appear nonblurred. For some applications, stationary or slowly moving objects could be successfully imaged with time constants much greater than 1/30 of a second.

In the operation of the device shown in FIG. 1, the electron beam may be of high or low velocity. In high velocity operation, the target 12 is at sufficiently high positive potential with respect to the cathode 26 of the electron gun 24 so that the electron beam strikes the target 12 with enough force to drive secondary electrons from the semiconductor layer 18, thereby rendering the surface more positive. In low velocity operation, the cathode 26 and the target 12 are approximately at the same potential so that the scanning electron beam deposits electrons on the surface of the semiconductor layer 18 with a negligible amount of secondary emission, thereby making the surface of the semiconductor layer 18 more negative. The low velocity operation with suitable voltages is described herein.

A potential of about 30 volts positive with respect to the cathode 26 is applied on the signal electrode of the target 12. The semiconductor layer 18 is in intimate contact with the signal electrode which is also the infrared absorbing layer 16 of gold black. The surface of the layer 18 contacting the layer 16 will be at a positive potential of 30 volts. The exposed surface of the semiconductor layer 18 is scanned by the electron beam and is substantially at the potential of the cathode 26 because of the negative charging action of the electron beam. It is therefore seen that the voltage difference between the surfaces of the layer 18 produces an electric field across the semiconductor layer 18 of the order of $10^5$ volts per centimeter. There will be a small amount of conductivity within the semiconductor layer 18 in this state due to thermal activation of traps. In FIG. 7, this conductivity is illustrated by the dark current curves 94 and 96.

In the absence of infrared excitation, the scanned surface of the semiconductor layer 18 changes a volt or two positive with respect to the cathode 26 of the electron gun 24 during the 1/30 second interval between successive scans. The electron beam deposits sufficient electrons on the scanned surface semiconductor layer 18 to neutralize this accumulated charge and in doing so generates a direct current video signal in the signal electrode lead 23 from the target electrode 12. If the current is not sufficient, it may be desirable to utilize the auxiliary light source 52 which is focused on the target 12 to increase the conductivity of the material as previously explained. The resulting conductivity, which may be due either to the thermal activation of traps or auxiliary excitation, will produce a uniform conductivity within the layer 18, and no variation in conductivity will exist across the target 12. It is therefore seen that only a direct current video signal will be generated by the scanning beam with no thermal excitation and the signal is eliminated by a coupling condenser 60 in the output circuit.

If now the infrared radiation is focused onto the target 12, the formerly uniform conductivity induced by the auxiliary radiation or thermal activation of traps will be altered depending on the elemental temperature of the high lights and low lights of the scene. The infrared radiations are absorbed by the layer 16 of gold black and set up a thermal image therein corresponding to the infrared radiation image. The thermal image is in turn impressed on the semiconductor layer 18 by thermal conductivity from the layer 16. The thermal excitation of the semiconductor layer 18 will result in varying the conductivity of elemental areas of the semiconductor layer 18. This may be thought of as a conductivity image. This image will cause a variation in the charge on the scanned surface of the semiconductor layer 18, thereby setting up a corresponding charge image. The elements on the scanned surface of the semiconductor layer 18 will accumulate a variable charge during the 1/30 second interval between successive scans due to the variable conductivity resulting from the variable temperature over the surface, and an alternating current video signal will be generated and passed through the coupling condenser 60 to a suitable video amplifier tube 62. The video signal thus obtained may be fed to a suitable display device such as a cathode ray tube to produce a visual image of the thermal image focused onto the target 12.

The layer 16 of gold black of this thickness is found to absorb substantially 30% to 90% or greater of the infrared radiation which is in turn converted into a thermal or heat pattern spatially distributed in the layer of gold black. This thermal image is impressed on the semiconductor layer 18 by thermal conduction in that the two layers are in intimate thermal contact. The target 12 is thermally isolated from the tube as far as heat transfer by conduction is concerned and depends on radiation to remove the heat.

In the device shown and described, thermal excitation of traps or photoconduction has been utilized to obtain a uniform conduction. There are other means of obtaining this uniform conductivity within a semiconductor material by other radiations, such as electron bombardment as illustrated by curve 90.

The device may also function in the visible and ultraviolet range since the infrared absorber may be transparent to visible and ultraviolet light. The change in conductivity in the visible and ultraviolet range would be due to photoconductivity in the semiconductor. By proper selection of materials, the device would operate in the ultraviolet region and also in the infrared region to at least 15 microns. Some materials are available that exhibit photoconductivity up to 5 microns.

Figure 3:
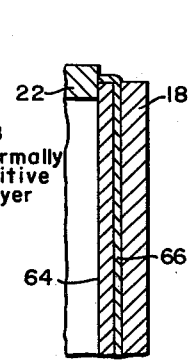
FIG. 3 is a cross section of a modified target screen which may be employed in FIG. 1.

In FIG. 3, a modified target electrode is shown in which a self-supporting layer 64 of aluminum oxide is mounted on the support ring 22. On the aluminum oxide layer 64 there is formed a thin metallic layer 66 of a suitable material such as nickel or gold which serves as the infrared absorbing material and also the signal electrode for the target electrode. On the nickel or gold layer 64 there is deposited the layer 18 of semiconductor material deposited in a similar manner as that deposited with respect to FIG. 2. The thin layer 66 provides the infrared absorbing layer and due to its small thickness of about 50 angstroms provides a small thermal mass and negligible transverse heat conductance.

Figure 4:
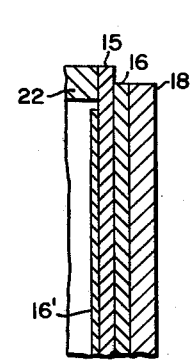
FIG. 4 is a schematic cross section of another modified target screen which may be employed in FIG. 1.

FIG. 4 is similar to FIG. 2 with the addition of a layer 16' of infrared absorbing material deposited on the input side of the support layer 15. It is also possible to mix the infrared absorbing material with the semiconductor layer to form a single layer target.

Figure 5:
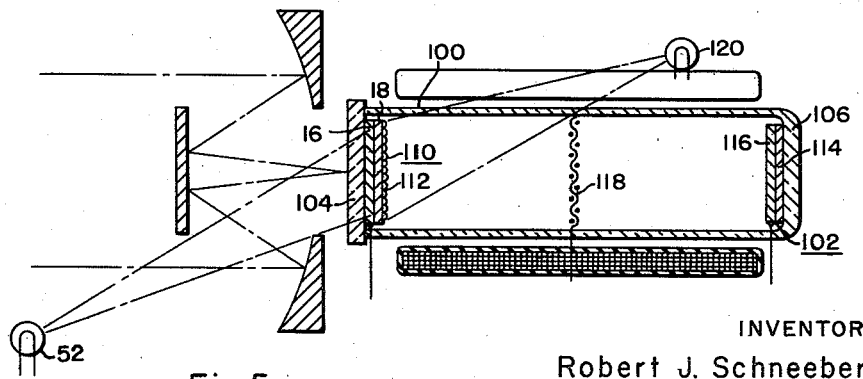
FIG. 5 is a schematic representation of another type of an electronic discharge tube embodying the principles of my invention.

Referring in detail to FIG. 5, there is shown another embodiment of my invention. In this device a vacuum-tight enclosure 100 of a suitable material such as glass also encloses a display screen 102. The input window 104 is of similar material to that provided with respect to FIG. 1 with an output window 106 of a transparent material such as glass. Positioned on the input window 104 is an input screen or target 110 which consists of an infrared absorbing layer 16, a semiconductor layer 18, and a layer of photoemissive material 112. The layer of photoemissive material 112 may be continuous or mosaic and of a material such as cesiated antimony or gold. Positioned near or on the output window 106 is the output screen 102 comprised of a layer of a suitable phosphor material 114 which is shown deposited directly on the output window 106. A suitable conductive coating 116 of a material such as aluminum may be deposited on the phosphor layer 114 and a lead provided to the exterior of the tube. Positioned intermediate the target screen 110 and the output screen 102 is a planar electrode grid member 118. An auxiliary light source 120 is provided on the exterior of the envelope 100 and illuminates the photoemissive surface 112 on the target surface in a uniform manner.

In operation, the photoemissive layer 112 is excited by the auxiliary light source 120 so as to cause photoemission. The output screen 102 is operated on the order of 20 kilovolts positive with respect to the target electrode 110. The grid 118, positioned between the target electrode 110 and the output screen 102, is held at a fixed potential of about 100 volts positive with respect to the cathode. The photoemissive surface 112 will charge up when illuminated by the auxiliary light source 120 to the potential of the intermediate grid 118. When the infrared radiations are focused onto the target 110, the radiations will be absorbed by the infrared absorbing layer 16, and the thermal image set up therein will be impressed on the semiconductor layer 18 setting up a conductivity image corresponding to the thermal image. This, in effect, causes the potential differences between the elemental areas of the target electrode 110 and the output screen 102 to be of a higher value since resistance of the semiconductor layer 18 is decreased. This results in electrons passing through the grid 118 to the output screen 102. The electrons thus generated are allowed to pass through the intermediate grid 118 and will bombard the output screen 102 causing the screen to display a light image corresponding to the infrared radiation image focused on the input screen.

Figure 6:
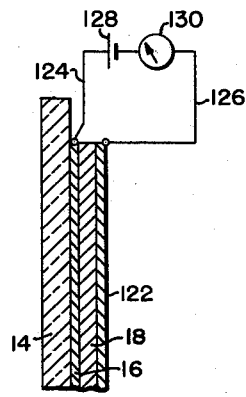
FIG. 6 is a schematic representation of a detector embodying the principles of my invention.

Referring in detail to FIG. 6, there is shown an infrared sensitive detector. The detector consists of an infrared transmitting window 14, a layer of infrared absorbing material 16, a thermally sensitive layer 18 and conductive layer 122, in the order named. A lead 124 is connected to the layer of infrared absorbing material 16 which serves as one electrode and a lead 126 is connected to the conductive layer 122 which serves as the other electrode. The conductive layer 122 may also be an infrared absorber. A source of potential 128 is applied across the two leads 124 and 126 and a meter 130 connected in the circuit will measure the current.

The operation of the device is similar to those previously described. Infrared radiation will again be absorbed by the layer 16 of gold black and converted into heat which is conducted to the layer 18. The conductivity of the layer 18 will be modified which will in turn modify the current in the circuit. It may be desirable to use auxiliary radiation as previously described to establish conductivity in the semiconductor layer 18. The resistivity need not be as high in the detector to preserve resolution.

It may be desirable to lower the temperature of the target in some applications. Consider a target having temperature $T_2$ and emissivity $e$ on both sides surrounded by a box of temperature $T_1$ except for a circular hole which subtends an angle $\beta$ from the target. Through this angle $\beta$ the target sees an object (through an optical system) at temperature $T_3$. It can be shown that the contrast sensitivity.

$$\frac{\Delta T_2}{\Delta T_3} = \frac{1}{2}\left[\frac{T_3}{T_2}\right]^3 \sin^2 \frac{1}{2}\beta$$

where $\Delta T_2$ is the change in temperature of an element on the target for a change $\Delta T_3$ in temperature of an element on the object. Also, $$\frac{1}{2}\beta^2 \approx \frac{1}{4f^2}$$

where $f$ is the $f$-number of the optical system. It is desired to make $\Delta T_2/\Delta T_3$ as large as possible. Reducing target temperature $T_2$ by making $T_1$ as low as possible will increase $\Delta T_2/\Delta T_3$ by the factor $$\left(\frac{T_3}{T_2}\right)^3$$

The thermal time constant of the target must also be considered. If $T_3$, for example, is suddenly reduced by an amount $\Delta T_3$, $\Delta T_2$ will reach its equilibrium value at time $=\infty$. Since the relationship between $\Delta T_2$ and time is exponential, the time constant (time when $\Delta T_2$ reaches $$\left(1-\frac{1}{\epsilon}\right)$$

of its equilibrium value of the target) can be expressed as $$t = \frac{H}{4\sigma T_2^3 e}$$

where $t$ is time, H is the heat capacity for unit target area, $\delta$ is the Steffan-Boltzmann constant, $T_2$ is the target temperature and $e$ is the target emissivity.

The time constant of the target should be low (1/30 second for viewing moving objects). Since heat capacity for a unit target area is equal to the product of specific heat, density and thickness, it is desirable to keep this product low. The total heat capacity of the target should be less than $10^{-4}$ watt seconds per degree Kelvin per square centimeter. For low time constant, $e$ should be high, and $T_2$ should be high. Thus, while lowering $T_2$ for a gain in contrast sensitivity, one sacrifices the thermal time constant of the target.

The thermal resolution of the image devices described herein are limited by heat transfer between target elements by conduction. The entire target should have a low heat transfer of less than about $10^{-6}$ watts per degree Kelvin for a resolution of 400 lines per inch. The support for the semiconductor layer 18 should be less than about $10^{-7}$ watts per degree Kelvin. It can be shown that the thermal resolution $M_0$ in lines per centimeter is $$M_0 = \frac{M}{\pi} \frac{2e\delta T_2^3}{kt}$$

where M is a constant involving the contrast sensitivity of the system, $e$=target emissivity, $\delta$=Steffan-Boltzmann constant, $T_2$=target temperature, $k$=target thermal conductivity, $t$=target thickness. Thus for a high $M_0$, emissivity and temperature of the target should be high, while conductivity and thickness should be low. Thus, a reduction in temperature of target would reduce thermal resolution.

There are other suitable materials that exhibit a change in conductivity with temperature. Some additional materials are given in a copending application filed April 26, 1956, Serial No. 580,856, entitled "Process for Producing Lithium Substituted Transition Metal Oxides and Members Prepared Therefrom" by W. Johnston et al., now Patent 2,993,011, issued July 18, 1961. There are also organic materials such as beeswax.

While I have shown my invention in only a few forms, it will be obvious to those skilled in the art that it is not so limited but is susceptible to various other changes and modifications without departing from the spirit and scope thereof.

I claim as my invention:

1. A pickup tube comprising an evacuated envelope, an electron source to generate an electron beam and a target electrode positioned so as to be scanned by said electron beam, said target comprising a material in sooty form exhibiting the property of increased electrical conductivity on thermal excitation, said material in sooty form having a heat capacity of less than $10^{-4}$ watt seconds per degree Kelvin per square centimeter.

2. A system for detecting the presence of both visible and infrared radiations comprising an input screen exposed to said infrared radiation, said input screen comprising semiconductor material in a very porous deposit which exhibits a change in electrical conductivity in response to thermal excitation and in response to visible radiation, infrared absorbing material being transmissive to visible radiation and disposed in intimate thermal contact with said semiconductor material, means for providing an electric field across said semiconductor material, said means including an electron gun having at least a cathode for charging one surface of said input screen to a potential substantially that of said cathode, while the other surface of said input screen is held at some fixed potential different from said charged surface, the thermal pattern set up in said infrared absorbing material by the intensity variation of said infrared radiation being impressed on said semiconductor material whereby a corresponding electrical conductivity pattern is produced in said semiconductor material whereby the charge on said charged surface of said input screen is modified corresponding to said infrared radiations, and circuit means connected to said input screen for deriving an electrical signal in response to charge restoring action of said electron beam.

3. A system for detecting the presence of infrared radiations comprising an input element exposed to infrared radiation, said input element comprising semiconductor material in a very porous deposit which exhibits a change in electrical conductivity in response to thermal excitation, infrared absorbing material in intimate thermal contact with said semiconductor material, means for providing an electric field across said semiconductor material, said infrared radiations on said input element being absorbed by said infrared absorbing material thereby setting up a thermal pattern in said input element corresponding to said infrared radiations, the thermal pattern set up in said infrered absorbing material impressed on said semiconductor material whereby an electrical conductivity pattern is produced in said semiconductor material, and circuit means connected across said semiconductor material to derive an electrical signal in response to the conductive pattern set up in said semiconductor material.

4. An anfrared pickup tube comprising an input screen exposed to infrared radiation, said screen comprised of a layer of infrared absorbing material and a layer of semiconductive material in sooty form in intimate thermal contact with said infrared absorbing layer, said semiconductive layer of a material exhibiting the property of change in electrical conductivity on thermal excitation, said infrared radiations on said infrared absorbing material setting up a thermal image therein which in turn excites said semiconductive material to modify its electrical conductivity, and circuit means connected across said semiconductive layer to derive an electrical signal corresponding to the modification of the electrical conductivity in said semiconductive layer.

5. An infrared pickup tube comprising an input screen exposed to infrared radiation, said screen comprised of a layer of infrared absorbing material and a layer of semiconductive material in sooty form in intimate thermal contact with said infrared absorbing layer, said semiconductive layer of a material exhibiting the property of change in electrical conductivity on thermal excitation, said infrared radiations on said infrared absorbing material setting up a thermal image therein which in turn excites said semiconductive material to modify its electrical conductivity, means for isolating said screen from unwanted radiations and reflections, and circuit means connected across said semiconductive layer to derive an electrical signal corresponding to the modification of the electrical conductivity in said semiconductive layer.

6. An infrared pickup tube comprising an input screen exposed to infrared radiation, said screen comprised of a layer of infrared absorbing material and a layer of semiconductive material in sooty form in intimate thermal contact with said infrared absorbing layer, said semiconductive layer of a material exhibiting the property of change in electrical conductivity on thermal excitation, said infrared radiations on said infrared absorbing material setting up a thermal image therein which in turn excites said semiconductive material to modify its electrical conductivity, means for cooling said screen, and circuit means connected across said semiconductive layer to derive an electrical signal corresponding to the modification of the electrical conductivity in said semiconductive layer.

7. An infrared pickup tube comprising an input screen exposed to infrared radiation, said screen comprised of a layer of infrared absorbing material and a layer of semiconductive material in sooty form, said semiconductive layer exhibiting the property of increased electrical conductivity in response to temperature changes and the property of being photoconductively insensitive to said infrared radiations, means for exciting said semiconductive material to generate uniform electrical conductivity therein, so that said infrared radiations on said infrared absorbing layer set up a thermal image therein corresponding to the intensity distribution of said infrared radiation and modify the electrical conductivity within said semiconductor layer due to thermal conduction from said infrared absorbing layer, and electrically conductive circuit means coupled to said input screen to derive an electrical signal therefrom in accordance with said modification of electrical conductivity within said semiconductor layer.

8. A target structure for a pick-up tube comprising a first layer of material having the properties of being transmissive to at least some visible radiation and of absorbing at least some infrared radiation, a second layer of material the conductivity of which varies in response to visible radiation and to temperature changes, said second layer being in a sooty appearing form having a very porous structure disposed in intimate thermal contact with said first layer.

References Cited in the file of this patent

UNITED STATES PATENTS

| | | |
|---|---|---|
| 2,177,736 | Miller | Oct. 31, 1939 |
| 2,506,741 | Rose | May 9, 1950 |
| 2,522,153 | Andrews | Sept. 12, 1950 |
| 2,541,374 | Morton | Feb. 13, 1951 |
| 2,572,494 | Krieger et al. | Oct. 23, 1951 |
| 2,575,033 | Szegho | Nov. 13, 1951 |
| 2,654,853 | Weimer | Oct. 6, 1953 |
| 2,710,813 | Forgue | June 14, 1955 |
| 2,761,072 | Wormser | Aug. 28, 1956 |
| 2,788,452 | Sternglass | Apr. 9, 1957 |
| 2,816,954 | Huffman | Dec. 17, 1957 |
| 2,821,637 | Roberts et al. | Jan. 28, 1958 |
| 2,824,235 | Hahn et al. | Feb. 18, 1958 |
| 2,863,087 | Barbier | Dec. 2, 1958 |
| 2,864,887 | Weimer | Dec. 16, 1958 |
| 2,879,424 | Garbuny et al. | Mar. 24, 1959 |

FOREIGN PATENTS

| | | |
|---|---|---|
| 1,084,262 | France | Jan. 18, 1955 |

OTHER REFERENCES

"The Production of Film Type Bolometers with Rapid Response," by C. B. Aiken et al., The Review of Scientific Instruments, vol. 17, No. 10, October 1946, pages 377–385.

"Properties of Thermistor Infrared Detectors," by Eric M. Wormser, Journal of the Optical Society of America, vol. 43, No. 1, January 1953, pages 15–21.